United States Patent
Bruno et al.

(10) Patent No.: US 11,353,375 B2
(45) Date of Patent: Jun. 7, 2022

(54) USING VIBRATIONS TO POSITION DEVICES IN A TEST SYSTEM

(71) Applicant: Teradyne, Inc., North Reading, MA (US)

(72) Inventors: Christopher J. Bruno, Hudson, MA (US); Mark S. O'Brien, East Boston, MA (US); Philip Campbell, Bedford, NH (US); Marc LeSueur Smith, Sterling, MA (US); Adnan Khalid, North Reading, MA (US)

(73) Assignee: TERADYNE, INC., North Reading, MA (US)

( * ) Notice: Subject to any disclaimer, the term of this patent is extended or adjusted under 35 U.S.C. 154(b) by 260 days.

(21) Appl. No.: 16/456,700

(22) Filed: Jun. 28, 2019

(65) Prior Publication Data
US 2020/0408634 A1    Dec. 31, 2020

(51) Int. Cl.
*G01M 7/02*    (2006.01)
(52) U.S. Cl.
CPC ............ *G01M 7/025* (2013.01); *G01M 7/022* (2013.01); *G01M 7/027* (2013.01)
(58) Field of Classification Search
CPC ....... G01M 7/025; G01M 7/022; G01M 7/027
USPC .......................................................... 73/663
See application file for complete search history.

(56) References Cited

U.S. PATENT DOCUMENTS

| | | |
|---|---|---|
| 4,112,364 A | 9/1978 | Katz |
| 4,130,002 A | 12/1978 | Katz |
| 4,894,753 A | 1/1990 | Wadell et al. |
| 6,593,535 B2 | 7/2003 | Gailus |
| 6,762,941 B2 | 7/2004 | Roth |
| 7,778,031 B1 | 8/2010 | Merrow et al. |
| 7,848,106 B2 | 12/2010 | Merrow |
| 7,890,207 B2 | 2/2011 | Toscano et al. |
| 7,904,211 B2 | 3/2011 | Merrow et al. |
| 7,908,029 B2 | 3/2011 | Slocum, III |
| 7,911,778 B2 | 3/2011 | Merrow et al. |
| 7,920,380 B2 | 4/2011 | Merrow et al. |
| 7,929,303 B1 | 4/2011 | Merrow |
| 7,932,734 B2 | 4/2011 | Merrow et al. |
| 7,940,529 B2 | 5/2011 | Merrow et al. |
| 7,945,424 B2 | 5/2011 | Garcia et al. |
| 7,987,018 B2 | 7/2011 | Polyakov et al. |
| 7,995,349 B2 | 8/2011 | Merrow et al. |

(Continued)

FOREIGN PATENT DOCUMENTS

| | | |
|---|---|---|
| JP | 11-169790 A | 6/1999 |
| KR | 10-2009-0085743 A | 8/2009 |

(Continued)

OTHER PUBLICATIONS

International Search Report received for International Patent Application No. PCT/US2020/032293, 4 pages, dated Aug. 28, 2020.

(Continued)

*Primary Examiner* — Lisa M Caputo
*Assistant Examiner* — Rose M Miller
(74) *Attorney, Agent, or Firm* — Burns & Levinson LLP (57) ABSTRACT

An example test system includes a tray to hold devices, where the devices include devices to be tested or devices that have been tested; a motor that is controllable to cause vibrations; and a component that couples the motor to the tray to cause the tray to vibrate in response to the vibrations of the motor.

22 Claims, 5 Drawing Sheets

(56) References Cited

U.S. PATENT DOCUMENTS

| | | |
|---|---|---|
| 7,996,174 B2 | 8/2011 | Garcia et al. |
| 8,041,449 B2 | 10/2011 | Noble et al. |
| 8,086,343 B2 | 12/2011 | Slocum, III |
| 8,095,234 B2 | 1/2012 | Polyakov et al. |
| 8,102,173 B2 | 1/2012 | Merrow et al. |
| 8,116,079 B2 | 2/2012 | Merrow et al. |
| 8,117,480 B2 | 2/2012 | Merrow et al. |
| 8,140,182 B2 | 3/2012 | Noble et al. |
| 8,160,739 B2 | 4/2012 | Toscano et al. |
| 8,238,099 B2 | 8/2012 | Merrow et al. |
| 8,279,603 B2 | 10/2012 | Merrow et al. |
| 8,305,751 B2 | 11/2012 | Merrow et al. |
| 8,405,971 B2 | 3/2013 | Merrow et al. |
| 8,451,608 B2 | 5/2013 | Merrow et al. |
| 8,466,699 B2 | 6/2013 | Merrow et al. |
| 8,467,180 B2 | 6/2013 | Merrow et al. |
| 8,482,915 B2 | 7/2013 | Merrow et al. |
| 8,499,611 B2 | 8/2013 | Merrow et al. |
| 8,547,123 B2 | 10/2013 | Merrow et al. |
| 8,549,912 B2 | 10/2013 | Merrow et al. |
| 8,628,239 B2 | 1/2014 | Merrow et al. |
| 8,631,698 B2 | 1/2014 | Merrow et al. |
| 8,655,482 B2 | 2/2014 | Merrow et al. |
| 8,687,349 B2 | 4/2014 | Truebenbach et al. |
| 8,687,356 B2 | 4/2014 | Merrow et al. |
| 8,712,580 B2 | 4/2014 | Polyakov et al. |
| 8,964,361 B2 | 2/2015 | Truebenbach et al. |
| 9,001,456 B2 | 4/2015 | Campbell et al. |
| 9,002,186 B2 | 4/2015 | Akers et al. |
| 9,779,780 B2 | 10/2017 | Martino et al. |
| 2007/0296140 A1* | 12/2007 | Babanats ................ B65H 3/60 271/146 |
| 2011/0067633 A1* | 3/2011 | Correa ................ A01K 45/007 119/6.8 |
| 2012/0048785 A1* | 3/2012 | Green .................... F42B 33/10 209/682 |
| 2013/0125658 A1 | 5/2013 | Lee et al. |
| 2019/0064252 A1 | 2/2019 | Bowyer et al. |
| 2019/0064254 A1 | 2/2019 | Bowyer et al. |
| 2019/0064261 A1 | 2/2019 | Bowyer et al. |
| 2019/0064305 A1 | 2/2019 | Khalid |

FOREIGN PATENT DOCUMENTS

| | | |
|---|---|---|
| KR | 10-1266650 B1 | 5/2013 |
| KR | 10-2014-0109517 A | 9/2014 |

OTHER PUBLICATIONS

Written Opinion received for International Patent Application No. PCT/US2020/032293, 5 pages, dated Aug. 28, 2020.

International Preliminary Report on Patentability received for International Patent Application No. PCT/US2020/032293, 6 pages, dated Dec. 28, 2021.

* cited by examiner

USING VIBRATIONS TO POSITION DEVICES IN A TEST SYSTEM

TECHNICAL FIELD

This specification relates generally to using focused vibrations to position devices in a test system.

BACKGROUND

Test systems are configured to test the operation of electronic devices, such as microprocessors and memory chips. Testing may include sending signals to a device and determining how the device reacted to those signals based on its response. The device's reaction will dictate whether the device has passed or failed testing.

SUMMARY

An example test system comprises a tray to hold devices, where the devices comprise devices to be tested or devices that have been tested; a motor that is controllable to cause vibrations; and a component that couples the motor to the tray to cause the tray to vibrate in response to the vibrations of the motor. The test system may include one or more of the following features, either alone or in combination.

The component may be configured to hold the motor against the tray to couple the motor directly to the tray. The example test system may comprise a frame to hold the tray. The component may be configured to hold the motor against the frame to couple the motor to the tray via the frame. The component may be flexible and may be configured to bend away from the tray in response to contact with the tray.

The tray may comprise receptacles, with each receptacle being configured to hold a device. The vibrations may be calibrated to cause a misplaced device within a receptacle to settle within the receptacle. The example test system may also comprise a power supply to power the motor. The motor may comprise an eccentric mass. The example test system may comprise a control system to set a voltage input to the motor to control a speed of rotation of the eccentric mass to cause vibrations at a specific frequency ad amplitude and to set a duration of operation of the motor. The voltage may be from 3 volts to 4 volts and the duration may be from 1 second to 3 seconds.

The example test system may also comprise a feeder to move the tray containing untested devices into position proximate to the motor. The control system may be configured to control operation of the motor to cause the vibrations after the feeder is moved into the position. As noted, the example test system may also comprise a frame to hold the tray. The feeder may be configured to move the frame holding the tray so that the tray is in position relative to the motor. The feeder may comprise belts to move the tray and a pushing device to push the tray against a surface of the frame. The tray may be part of a cassette of multiple trays. The tray may be movable up and down within the cassette relative to a surface holding the test system.

The control system may be configured to cause operation of the motor based on a total mass of devices in the tray. The feeder may be configured to move the tray containing tested devices away from the motor. The control system may be configured to cause operation of the motor before the feeder is moved away from the motor. The feeder may be configured to move the tray containing tested devices away from the motor and may be configured to move the tray containing tested devices towards to the motor. The control system may be configured to cause operation of the motor before the feeder is moved away from the motor and after the tray is moved towards the motor.

The example test system may also comprise a test carrier for holding at least some of the devices; a device shuttle to transport the at least some of devices between the tray and the test carrier; and a first robot to move the at least some of devices between the test carrier and the device shuttle. The device shuttle may be configured to move, towards a stage of the test system containing the first robot, a first device among the devices that has not been tested. The device shuttle may be configured to move in a first dimension. The first robot may be configured to move the first device from the device shuttle to the test carrier. The first robot may be configured to move in a second dimension that is different from the first dimension. A second robot may be configured to move the at least some of the devices between the tray and the device shuttle. The example test system may also comprise a second robot to move the first device from the first tray to the shuttle and to move a second device among the devices that has been tested from the shuttle to the second tray.

The tray may be a first tray; the motor may be a first motor; and the component may be a first component. The example test system may also comprise a second tray to hold devices; a second motor that is controllable to cause vibrations; and a second component that couples the second motor to the second tray to cause the second tray to vibrate in response to the vibrations of the second motor. The example test system may also comprise a third tray to hold devices; a third motor that is controllable to cause vibrations; and a third component that couples the third motor to the third tray to cause the third tray to vibrate in response to the vibrations of the third motor. The first tray, the second tray, and the third tray may be arranged in parallel in the test system.

Any two or more of the features described in this specification, including in this summary section, can be combined to form implementations not specifically described herein.

The systems and techniques and processes described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques and processes described herein, or portions thereof, can be implemented as an apparatus, method, or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DETAILED DESCRIPTION

Described herein are example implementations of a carrier-based test system. An example carrier-based test system includes, among other components, a carrier having one or more test sockets, each to receive a device to test. A device being tested is referred to as a device under test, or DUT. DUTs may be loaded into the test system and removed from the test system using trays, such as JEDEC (Joint Electron Device Engineering Council) trays. For example, a transport robot may be configured and controllable to place tested devices into a tray and to move untested devices out of a tray for testing. Each tray may include multiple receptacles, which are also referred to as "nests". The receptacles may be sized to accommodate the DUTs being tested. However, alignment of the transport robot to each receptacle may not always be perfect, resulting in one or more of the DUTs being off-center or rotated within the receptacles. Mishandling of untested DUTs by a technician can also result in one or more of the DUTs being off-center within the receptacles. To address this—for example, to improve the positioning of a DUT in a tray receptacle—the tray may be subjected to focused and controlled vibrations. For example, a rotary vibrating motor may be physically coupled, directly or indirectly, to the tray. Operation of the motor for an appropriate time and at an appropriate frequency causes movement of the DUTs within their respective receptacles. This movement of the DUTs causes all or some of the DUTs to settle correctly within their respective receptacles. As result, all or some of the DUTs may be better positioned in their respective trays for removal by a robot or other automated component of the test system.

The concepts described herein are not limited to use with the test system described herein or to use with testing in general. Rather, the concepts may be applied in any appropriate technological context.

Figure 1:
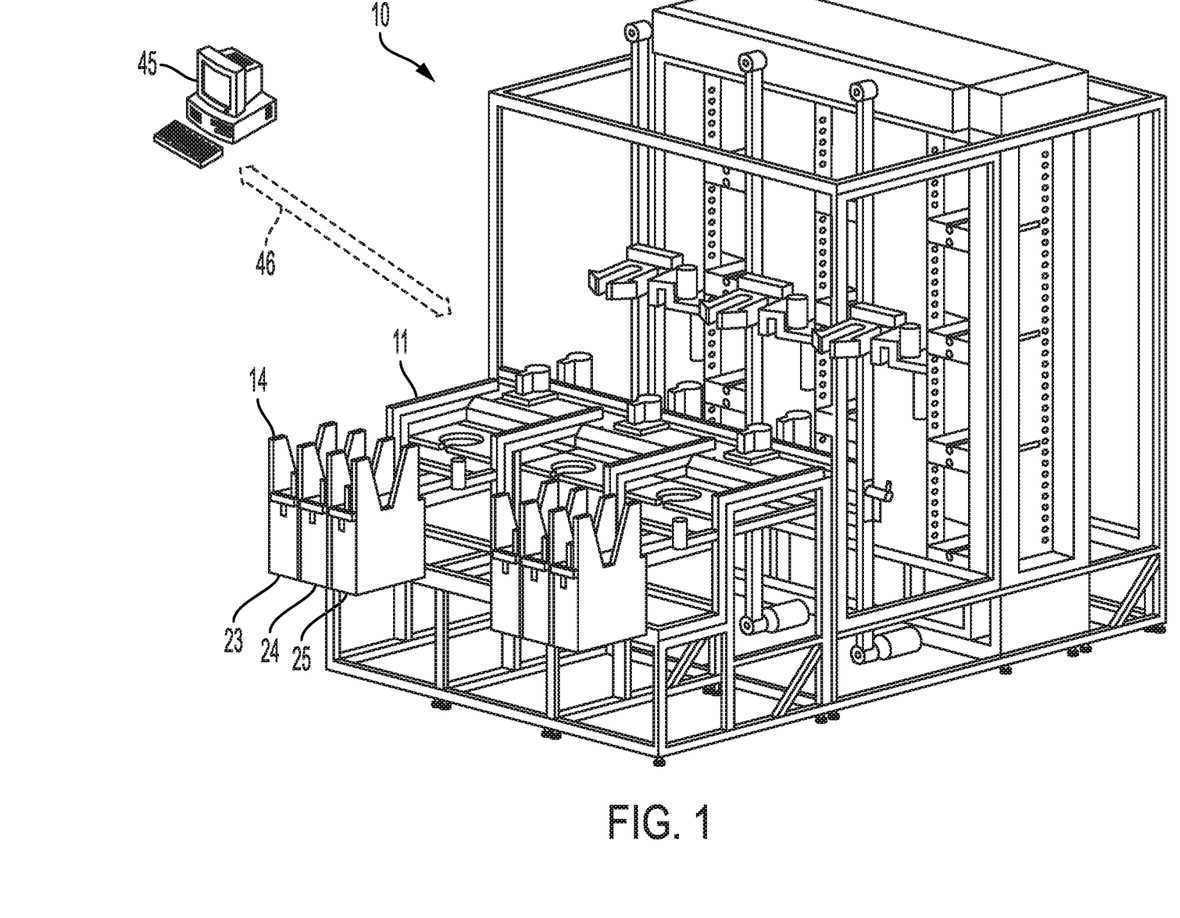
FIG. 1 is a perspective view of an example test system.
Figure 2:
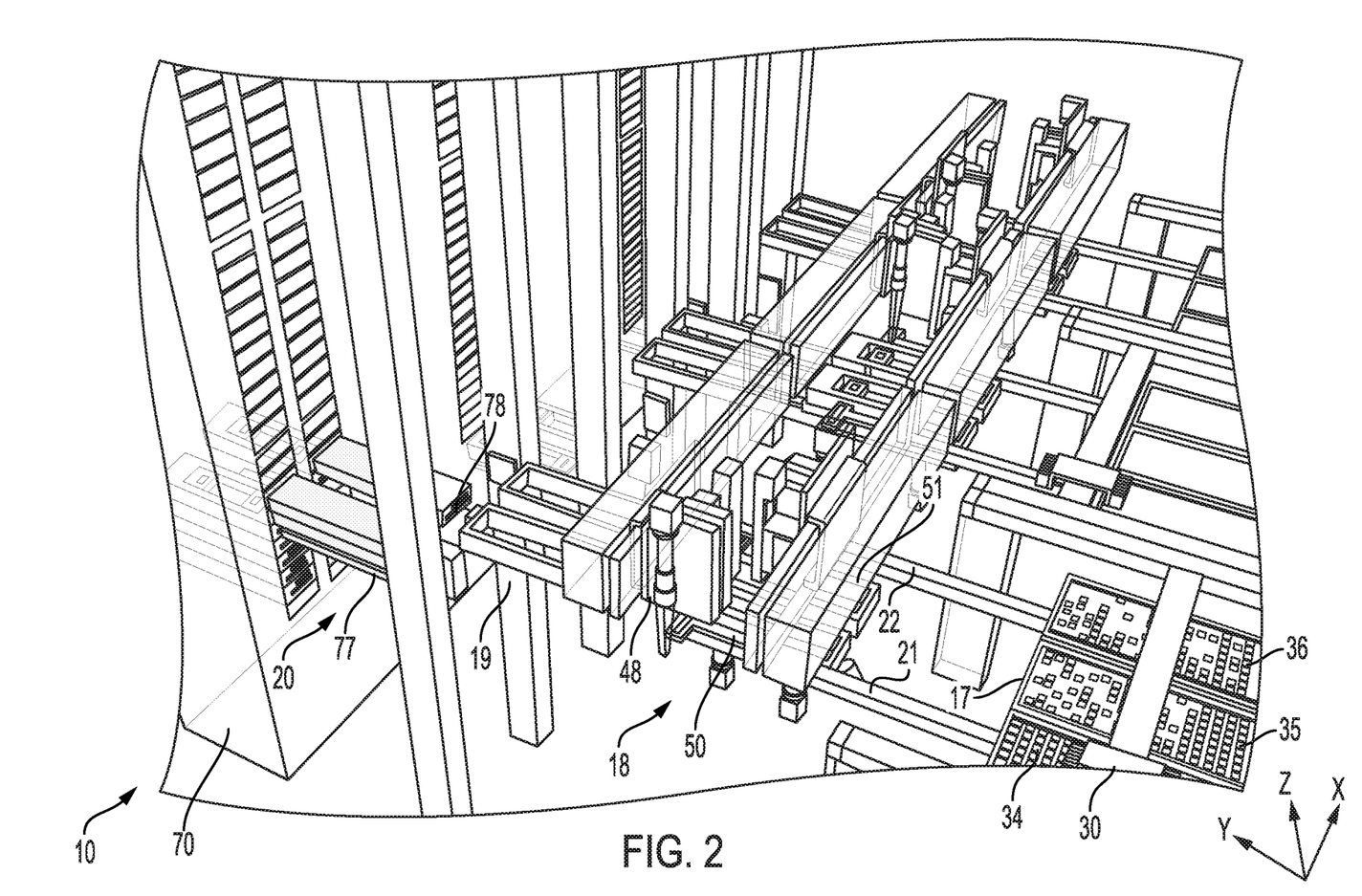
FIGS. 2 and 3 are perspective views showing examples of internal components of the test system of FIG. 1 at different configurations during operation.
Figure 3:
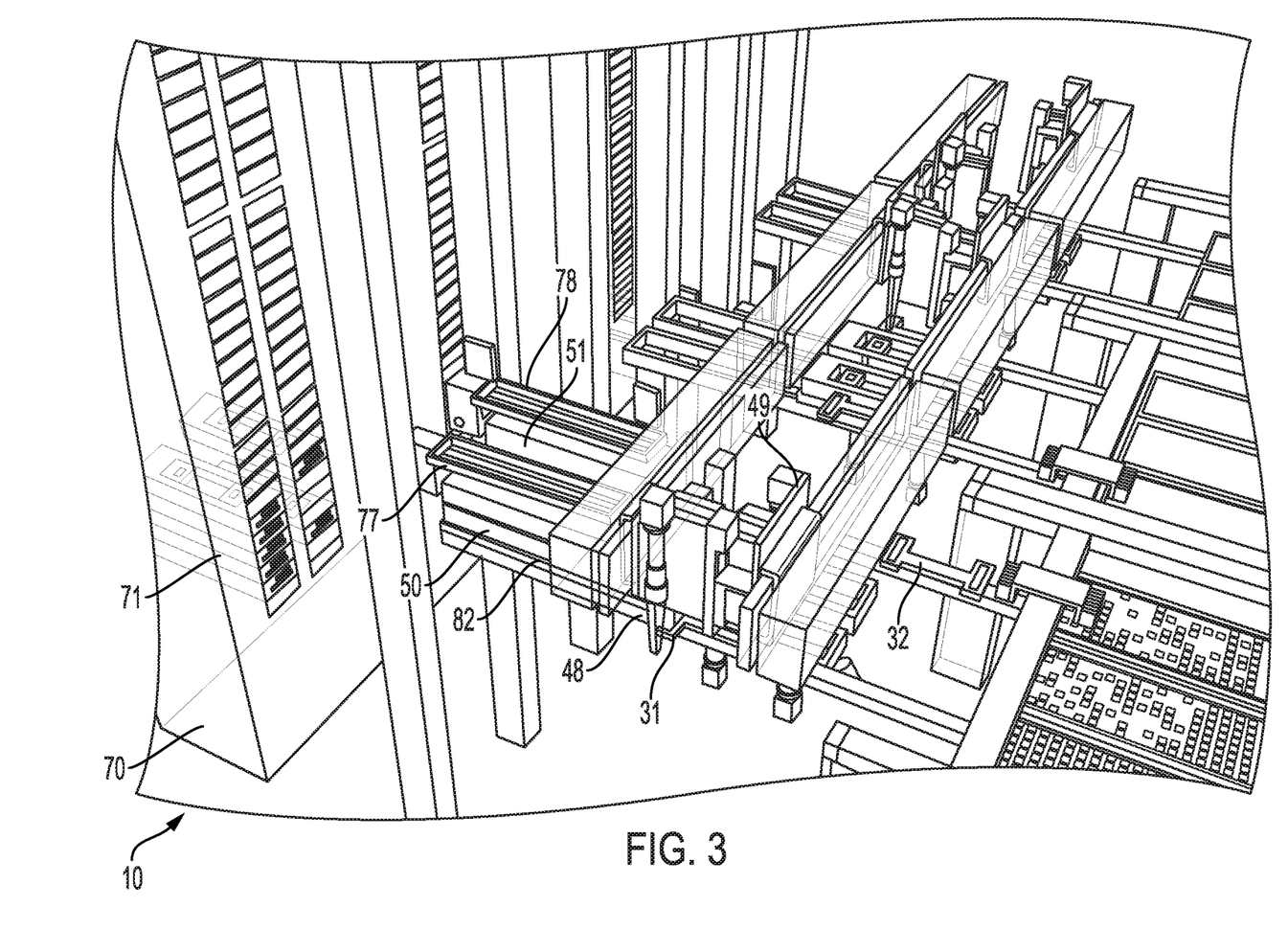

Referring to FIGS. 1, 2, and 3, example test system 10 includes five stages (or zones) per automated test subsystem; however, any appropriate number of stages may be included in the test system. In this regard, the example test system is modular, enabling the test system to accommodate various testing requirements. Each unit of the test system is referred to as a slice. Two or more slices may be combined and controlled to operate in concert (e.g., dependently) or independently to perform testing operations.

In an example implementation, the five stages include an input/output (I/O) stage 14, a transport stage 17, a loading stage 18, an insertion stage 19, and a test stage 20. The definitions of the various stages are not meant to be limiting, and one or more components may perform functions in two or more of the stages. In some implementations, different stages are configured to operate with different levels of precision. For example, higher levels of precision (e.g., down to the micron level) may be used in the loading stage, whereas lower levels of precision may be used in some or all other stages. System components, such as mechanical components, may be configured for operation within tolerances that enable lower levels of precision in some stages. By relegating higher precision to stages that may require it, the cost and complexity of the test system can be controlled in some cases.

Computing system 45 communicates with test system 10 to control, and to coordinate operations of, test system 10. Computing system 45 may include one or more processing devices, examples of which are described herein. Communications between test system 10 and computing system 45 are represented by dashed arrow 46.

The different stages of the test system may operate independently and contemporaneously. In the example of FIG. 2, each stage includes two parallel paths 21 and 22. Each of the parallel paths includes automation, such as robotics, to pass trays, carriers, devices, or both between adjacent stages. Operation of the different stages independently, contemporaneously, and in the parallel paths may support higher testing throughput and speed than some comparable test systems In the example of FIG. 1, I/O stage 14 includes, but is not limited to, feeders for receiving trays of tested devices and for providing trays of untested devices to the test system. The feeder is where a human operator interacts with the tester system. As noted above, examples of trays that may be used include JEDEC trays; however, the system may use any appropriate type of tray. In the example of FIG. 1, there are three feeders 23, 24, 25 per slice; however, the system is not limited to use with three feeders. A first feeder 23 is for trays containing untested devices; a second feeder 24 is for trays containing tested devices that have not passed testing, and a third feeder 25 is for trays containing devices that have passed testing. In this example, feeder 23 is loaded manually with trays of untested devices. A tray among a stack of trays containing untested devices is fed from feeder 23 to the transport stage 17. After all devices on that tray have been forwarded for testing, and the tray is empty, the tray is retracted into the feeder and a new tray containing untested devices is fed to the transport stage. After devices have been loaded onto that tray following testing, and the tray is full (in some implementations), the tray is retracted into the feeder and a new, empty tray is fed from the I/O stage to the transport stage from either feeder 24 or 25. In some implementations, operations of feeders 24 and 25 may be the same for trays containing devices that have passed testing and trays containing devices that have not passed testing. In some implementations, the trays handled by feeder 24 are part of a cartridge containing multiple trays that move up and down within the feeder. Devices may be binned on different trays handled by feeder 24 based on why those devices failed testing. An example bin is a physical and logical location that separates devices for post-test sorting. Accordingly, in the case of feeder 24, the feeder may feed a first tray containing tested devices into the system, remove that first tray after a tested device has been added, feed a second tray into the system, remove that second tray after a tested device has been added, and again feed the first tray into the system to receive a device that has failed testing for the same reason as other devices in the first tray.

Figure 4:
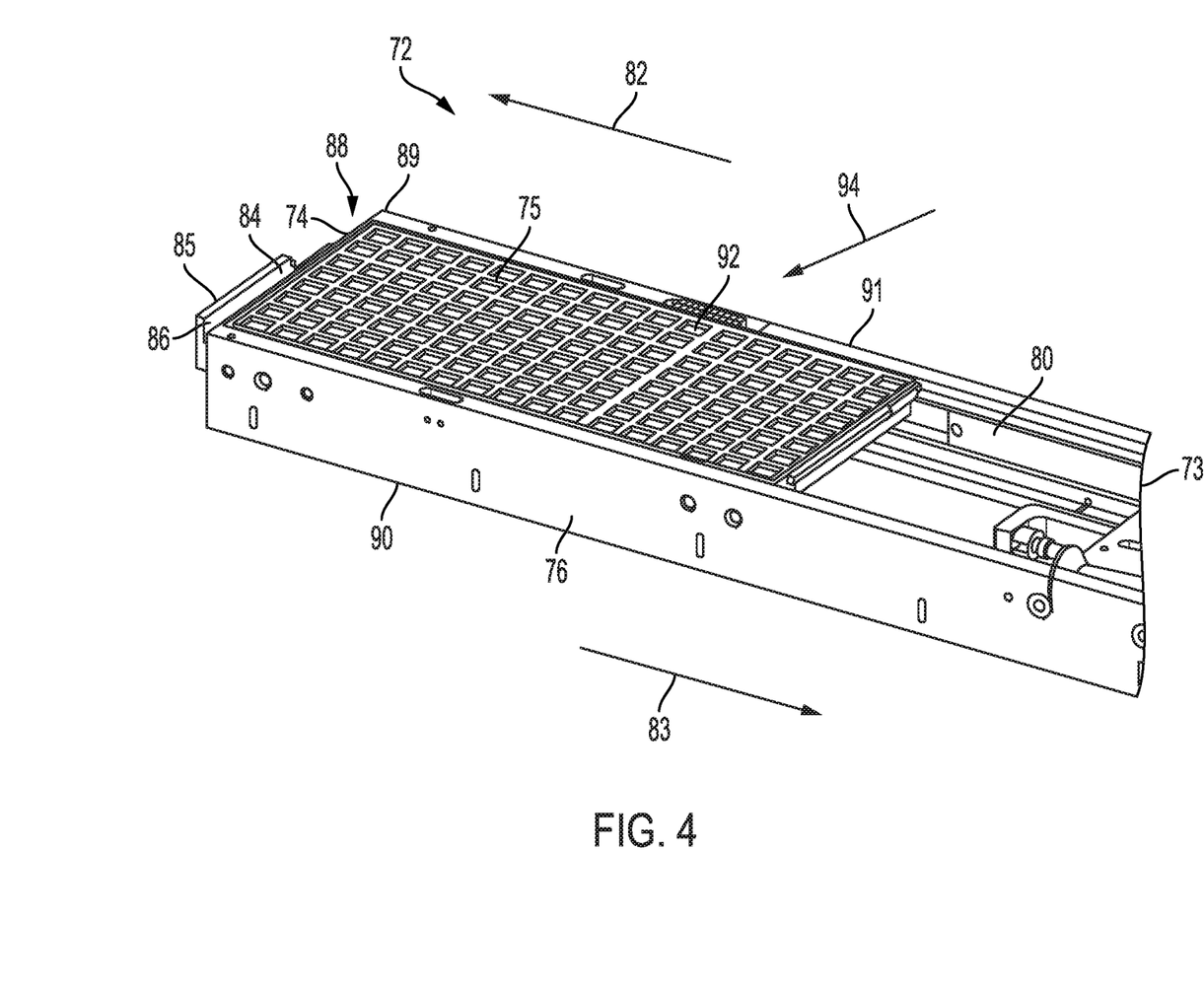
FIG. 4 is a perspective view of part of an example assembly containing components for adding vibrations to a test tray in the example system of FIGS. 1 to 3.
Figure 5:
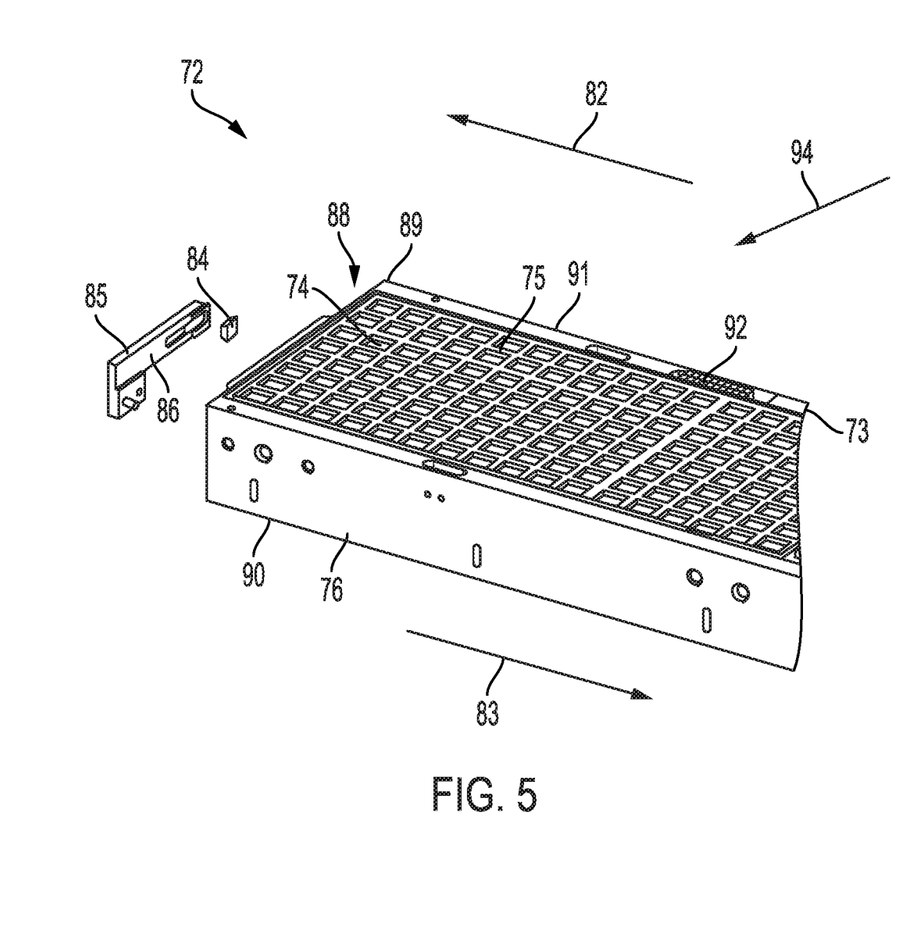
FIG. 5 an exploded view of parts of the assembly shown in FIG. 3.

FIGS. 4 and 5 show components of an example assembly 72 that may be incorporated into I/O stage 14 to hold trays such as trays 34, 35, and 36 of FIGS. 2 and 3. FIG. 4 shows a perspective view of part of assembly 72 (cut away at line 73) and FIG. 5 shows a partially-exploded view of part of assembly 72. In assembly 72, tray 74—which may be an example of trays 34, 35, and 36 of FIGS. 2 and 3—includes a two-dimensional array of receptacles 75 for holding tested DUTs, untested DUTs, or both tested DUTs and untested DUTs. In some implementations, the tray may include a one-dimensional array of receptacles. In some implementations, the tray may include a three-dimensional array of receptacles.

Assembly 72 includes a frame 76 that holds tray 74. The frame includes belts 80 (only one belt is visible in FIG. 4) that are controllable to move the tray in the direction of arrows 82 and 83. When fully extended in the direction of arrow 82, as shown in FIGS. 4 and 5, the tray is in the position shown by trays 34, 35, and 36 of FIGS. 2 and 3. When in the position shown by trays 34, 35, and 36 of FIGS. 2 and 3, a transport robot 30, which is described below, may remove untested DUTs from the tray or add tested DUTs to the tray, as also described below. When moved in the direction of arrow 83, the tray retracts into its corresponding feeder, such as feeders 23, 24, or 25. A new tray may then be introduced into the system through movement in the direction of arrow 82.

As shown in FIGS. 4 and 5, assembly 72 includes a motor 84 that is controllable to cause vibrations. For example, the motor may be controlled by computing system 45 that may be controlling the tester system. In some implementations, the motor includes an eccentric mass. The computing system may be configured to set a voltage input to the motor to control a speed of rotation of the eccentric mass to cause the vibrations and to set a duration of operation of the motor. The magnitude or amplitude, frequency, and duration of the vibrations will depend on the physical characteristics of the tray and of the DUT. For example, the magnitude or amplitude, frequency, and duration of the vibrations may depend on, and be set based upon, the size of the DUT, the size of the receptacle, the size of the DUT relative to the size of the receptacle, the weight of the tray, the weight of the tray when DUTs are added, and so forth.

In any case, the magnitude, the frequency, and the duration of the vibrations should be sufficient to move the individual DUTs within their respective receptacles but not to cause the individual DUTs to move out of their respective receptacles. For example, the magnitude, the frequency, and the duration of the vibrations may be sufficient to cause all or some of the individual DUTs to settle in their respective receptacles. For instance, the vibrations may be calibrated to cause a misplaced device within a receptacle to settle within the receptacle. For example, the magnitude, the frequency, and the duration of the vibrations may be sufficient to cause all or some of individual DUTs to settle in their respective receptacles such that the approximate center of each DUT aligns with the approximate center of its corresponding receptacle. The DUTs may also rotate about their center to orient correctly with the receptacle.

In an example implementation, motor 84 is a coin cell motor. In an example, a coin cell motor includes a printed circuit board (PCB) containing a three-pole commutation circuit around an internal shaft in a center of the motor. Two voice coils and an eccentric mass are integrated into a flat plastic disc having a bearing in its middle. This arrangement is mounted on the shaft. Brushes on an underside of the plastic disc contact the PCB commutation pads and provide power to the voice coils. This produces a magnetic field. This magnetic field interacts with magnetic flux generated by a disc magnet that is attached to a chassis of the motor. The commutation circuit alternates a direction of the magnetic field through the voice coils. This alternating magnetic field interacts with north-pole/south-pole pairs that are part of the magnet. As a result, the plastic disc rotates. The eccentric mass in the disc thus rotates causing vibrations. These vibrations are transferred to the motor housing. In some implementations, the coin cell motor operates from 1 second to 3 seconds using a voltage that is from 3 volts to 4 volts. In some implementations, the coin cell motor operates using a different voltage and for a different duration. A power supply (not shown) may be included to provide power to the motor.

Arrangement 72 also includes a component, such as arm 85, that couples motor 84 to tray 74 to cause the tray to vibrate in response to the vibrations of the motor. The coupling between the motor and the tray may be direct. For example, the motor may be in direct contact with the tray. In this case, vibrations of the motor are transferred directly to the tray. The coupling between the motor and the tray may be indirect. For example, there may be one or more components, such as frame 76, between the motor and the tray. In this case, vibrations from the motor are transferred to the tray through one or more components, such as frame 76, between the tray and the motor.

In the example of FIG. 4, arm 85 is physically connected to frame 76. Arm 85 holds motor on a side 86 of the arm that faces tray 74. In this example, frame 76 includes an opening 88 at its end 89. As a result, when moved into the position shown in FIGS. 4 and 5, tray 74 is directly accessible to, and in contact with, motor 84. Accordingly, the motor directly contacts tray 74. In some implementations, however, the motor may not be able to directly contact the tray. For example, the motor may be located at a side 90 or 91 of frame 76. Alternatively, frame 76 may completely surround the tray. In these example, which constitute an indirect coupling between the motor and the tray, vibrations are transferred from the motor to the frame to and then to the tray.

In some implementations, the arm is flexible and is configured to bend away from the tray in response to contact with the tray. For example, the arm may be made of bendable plastic, rubber, aluminum, composite, or any other appropriate material that bends and returns to its original position. In some implementations, the arm may be spring-loaded. In operation, as the tray advances in the direction of arrow 82 the tray eventually comes into contact with motor 84 mounted on arm 85. The arm bends in response to this contact and forces the motor against the tray. In some implementations—for example, where the frame surrounds the tray—the arm holds the motor against the frame to couple the motor to the tray via the frame.

In some implementations, frame 76 includes a member 92 that is made of flexible material. Member 92 applies diagonal force to tray 74 in the direction of arrow 94. The amount of force is sufficient to urge the tray against the frame and the arm without preventing the tray from moving within the frame. The amount of force required will vary based on factors such as the size, shape, and weight of the tray, the pre-existing compliance between the tray and the frame, the shape of the frame, and the flexibility of the arm. Other factors may also affect the amount of force that may be required.

In some implementations, the motor is operated to cause vibrations when the tray is in the position shown in FIG. 4. For example, when the tray contains untested DUTs, the vibrations are activated when the tray is in the position shown in FIG. 4 in order to cause the untested devices in the tray receptacles to settle. For example, when the tray contains tested DUTs, the vibrations are activated when the tray is in the position shown in FIG. 4 in order to cause the tested devices in the tray receptacles to settle. The tray containing the test DUTs may then be retracted into the feeder as described herein and replaced with a new empty tray or a different tray containing some tested DUTs and unoccupied receptacles to receive additional tested DUTs.

In some implementations, the motor may be operated at different times than those described above. For example, in implementations where the motor contacts the frame, the vibrations may be induced at any appropriate time. For example, the vibrations may be induced when the tray is at the location shown in FIG. 4. The vibrations may be induced as the tray travels from the feeder to the location shown in FIG. 4. The vibrations may be induced when the tray is initially introduced into the system, for example, at a location adjacent to the feeder.

As explained herein, in some implementations, the system may include three trays arranged in parallel, each having the assembly shown in FIGS. 2 and 3. In some implementations, there may be fewer than two trays or more than two trays.

Referring to FIGS. 2 and 3, transport stage 17 includes, but is not limited to, a transport robot 30 (e.g., FIG. 2) and two device shuttles 31, 32 (e.g., FIG. 3). The two device shuttles provide parallel transport paths, both into, and out of, the loading stage 18 described below, and support testing throughput and redundant reliability in some examples. Transport robot 30 is controllable to pick untested devices from a tray 34 (e.g., FIG. 2) and to place the untested devices onto device shuttles 31 and/or 32 (e.g., FIG. 3). Transport robot 30 is controllable to pick tested devices from device shuttles 31 and 32, and to place the tested devices into an appropriate one of trays 35 or 36, depending upon whether a particular device has passed testing or has not passed testing. In some implementations, transport robot 30 may pick and hold the device through air suction or using mechanical grips or other mechanical mechanisms. Following operation of the transport robot, vibrations may be introduced into the tray as described with respect to FIGS. 4 and 5.

In some implementations, the two devices shuttles may be configured and controlled to operate in parallel, independently, contemporaneously, and/or concurrently. For example, the transport robot may provide one device shuttle with devices to be tested, while removing devices that have been tested from another device shuttle. The two devices shuttles may be configured to move between the loading stage and the transport stage independently, in parallel, contemporaneously, and/or concurrently. For example, one device shuttle may transport devices to be tested from the transport stage towards, and to, the loading stage, while the other device shuttle transports devices that have been tested away from the loading stage and to the transport stage. In addition, one device shuttle may be stationary while the other device shuttle is moving. For example, one device shuttle may receive devices to be tested while the other device shuttle transports devices to or from the loading stage.

In some implementations, loading stage 18 includes, but is not limited to, loading robots 48, 49 and an area for loading devices into, and unloading devices from, test carriers, such as 50 and 51. In this example, there are two loading robots per slice; however, the test system may include any appropriate number of loading robots. In this example, loading robots 48, 49 are configured to move in the X dimension and also in the Z dimension to perform pick-and-place operations on devices. For example, untested devices are picked-up from a shuttle and moved into a carrier for testing, and tested devices are picked-up from a carrier and moved to a shuttle.

In the example of FIGS. 2 and 3, two test arms 77, 78 are shown per slice; however, the test system may include any appropriate number of test arms. The test arms are movable in all three dimensions—X, Y and Z, including rotations and flipping, in order to insert test carriers containing untested device into test slots in the test rack, and to extract, or to remove, test carriers containing tested devices from the test slots in the test rack. Carriers containing tested devices are moved back to the loading stage, where the devices are unloaded onto shuttles by the loading robots.

Each test arm is configured to hold two test carriers at the same time—one on each face or side of the test arm. In some implementations, each side of a test arm (e.g., 77 or 78) includes a carrier-holding receptacle, such as a gripper, for receiving, for holding, and for releasing a test carrier. In an example, the gripper is spring-loaded to accept a test carrier containing untested devices from a carrier shuttle, and to release a test carrier containing tested to device to the (same or different) carrier shuttle. The carrier shuttle may be configured to control opening and closing of each gripper. A carrier shuttle 82 may move the carrier between the test arm and loading position.

Test rack 70 includes multiple test slots. Carriers 71 are shown inside corresponding slots of the test rack. Each test slot may be configured and controllable to test devices in the test sockets on a test carrier, and to report the test results back to the computing system controlling the test system. The computing system keeps track of which devices passed testing and which devices failed testing, sorts the devices accordingly, and reports the test results. A test slot in the test rack is serviced by a test arm. In some implementations, during testing, a test slot always remains occupied except for the short time during which test carriers are exchanged in the test slot. For example, a test arm 77 or 78 may arrive at a test slot while holding a test carrier containing untested devices, extract a test carrier containing tested devices from the test slot, and insert the test carrier containing untested devices into that same test slot from which the other test carrier was extracted. Thus, except for the time between the removal and insertion of the test carriers, the test slot remains occupied. Each test slot in the test rack may be serviced in this manner to enhance testing throughput. Examples of how test carriers are inserted and extracted are provided below.

In operation, a test arm 77 or 78 moves—e.g., flips and rotates—to position itself to pick-up a test carrier containing untested devices from a carrier shuttle such as carrier shuttle 50, and to deposit the test carrier containing tested devices onto the (same or different) carrier shuttle. In this example, the test carrier rotates (e.g., about) 170° and flips. The rotation is about a longitudinal axis of the test arm and the flipping includes a rotation in the X dimension. As a result of this movement, an empty, first gripper on the test arm is in position to pick-up a test carrier containing untested devices from the carrier shuttle. Accordingly, the first gripper is controlled to pick-up the test carrier containing untested devices from the carrier shuttle. The test arm then rotates along its longitudinal axis at a point above, or proximate to, the carrier shuttle to position a test carrier containing tested devices for deposit onto the carrier shuttle. A second gripper on the test arm that is holding the test carrier is opened, resulting in the test carrier containing the tested devices being deposited on the carrier shuttle. Thereafter, the carrier shuttle transports the test carrier containing the tested devices to the loading stage.

At this time, therefore, the second gripper is empty and the first gripper holds a test carrier containing untested devices. Accordingly, the test arm rotates and flips to position the test arm to service a test slot. The test arm may also move vertically to position itself in front of a target test slot to be serviced. This rotation and flipping is opposite to the rotation and flipping performed to position the test arm above the carrier shuttle. Thus, the test arm is positioned to extract, or to receive, from the target test slot, a test carrier containing devices that have been tested. The test carrier containing devices that have been tested is received into the theretofore empty second gripper. Following receipt of the test carrier containing devices that have been tested, the test arm rotates to position the test carrier in the first gripper, which contains devices that have not been tested, into position for insertion into the same test slot. Thereafter, the test carrier containing devices that have not been tested is pushed into that test slot, and the foregoing operations are repeated, slot-by-slot.

Example implementations of a system containing some features of FIGS. 1 to 3 are described in U.S. Patent Publication No. 2019/0064305, which was filed on Aug. 28, 2017 and titled "Calibration Process For An Automated Test System. U.S. Patent Publication No. 2019/006430 is incorporated herein by reference. For example, the robotics and other components of input/output (I/O) stage 14 a transport stage 17, a loading stage 18, an insertion stage 19, and a test stage 20 are incorporated by reference into this application from U.S. Patent Publication No. 2019/006430.

The carrier-based test system may be, but is not necessarily, a system-level test (SLT) system. System-level testing involves testing an entire device, rather than individual components of the device. If the device passes a battery of system-level tests, it is assumed that the individual components of the device are operating properly. SLT has become more prevalent as the complexity of, and number of components in, devices have increased. For example, a chip-implemented system, such as an application-specific integrated circuit (ASIC), may be tested on a system level in order to determine that components that comprise the chip are functioning correctly.

The example systems described herein may be implemented by, and/or controlled using, one or more computer systems comprising hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The example systems described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may imply a direct physical connection or a wired or wireless connection that includes or does not include intervening components but that nevertheless allows electrical signals to flow between connected components. Any "connection" involving electrical circuitry that allows signals to flow, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A test system comprising:
   a tray comprising receptacles to hold devices, the devices comprising devices to be tested or devices that have been tested;
   a motor that is controllable to cause vibrations; and
   a component that couples the motor to a side of the tray to cause the tray to vibrate in response to the vibrations of the motor, the side of the tray surrounding the receptacles.

2. The test system of claim 1, wherein the component is configured to hold the motor against the tray to couple the motor directly to the tray.

3. The test system of claim 1, further comprising:
   a frame to hold the tray;
   wherein the component is configured to hold the motor against the frame to couple the motor to the tray via the frame.

4. The test system of claim 1, wherein the component is flexible and is configured to bend away from the tray in response to contact with the tray.

5. The test system of claim 1, wherein the tray is a first tray, the motor is a first motor, and the component is a first component; and wherein the test system further comprises:
   a second tray to hold devices;
   a second motor that is controllable to cause vibrations; and
   a second component that couples the second motor to the second tray to cause the second tray to vibrate in response to the vibrations of the second motor.

6. The test system of claim 5, further comprising:
a third tray to hold devices;
a third motor that is controllable to cause vibrations; and
a third component that couples the third motor to the third tray to cause the third tray to vibrate in response to the vibrations of the third motor;
wherein the first tray, the second tray, and the third tray are arranged in parallel in the test system.

7. The test system of claim 1,
wherein the vibrations are calibrated to cause a misplaced device within a receptacle to settle within the receptacle.

8. The test system of claim 1, further comprising:
a power supply to power the motor.

9. The test system of claim 1, wherein the motor comprises an eccentric mass; and
wherein the test system comprise a control system to set a voltage input to the motor to control a speed of rotation of the eccentric mass to cause the vibrations at a specific frequency and amplitude and to set a duration of operation of the motor.

10. The test system of claim 9, wherein the voltage is from 3 volts to 4 volts and wherein the duration is from 1 second to 3 seconds.

11. The test system of claim 1, further comprising a feeder to move the tray containing untested devices into position proximate to the motor.

12. The test system of claim 11, further comprising:
a control system to control operation of the motor to cause the vibrations after the feeder is moved into the position.

13. The test system of claim 11, further comprising:
a frame to hold the tray;
wherein the feeder is configured to move the frame holding the tray so that the tray is in position relative to the motor; and
wherein the feeder comprises belts to move the tray and a pushing device to push the tray against a surface of the frame.

14. The test system of claim 1, wherein the tray is part of a cassette of multiple trays, the tray being movable up and down within the cassette relative to a surface holding the test system.

15. The test system of claim 1, further comprising:
a control system to cause operation of the motor based on a total mass of devices in the tray.

16. The test system of claim 1, further comprising a feeder to move the tray containing tested devices away from the motor.

17. The test system of claim 16, further comprising:
a control system to cause operation of the motor before the feeder is moved away from the motor.

18. The test system of claim 1, further comprising a feeder to move the tray containing tested devices away from the motor and to move the tray containing tested devices towards to the motor.

19. The test system of claim 18, further comprising:
a control system to cause operation of the motor before the feeder is moved away from the motor and after the tray is moved towards the motor.

20. The test system of claim 1, further comprising:
a test carrier for holding at least some of the devices;
a device shuttle to transport the at least some of devices between the tray and the test carrier; and
a first robot to move the at least some of devices between the test carrier and the device shuttle;
wherein the device shuttle is configured to move, towards a stage of the test system containing the first robot, a first device among the devices that has not been tested, the device shuttle being configured to move in a first dimension; and
wherein the first robot is configured to move the first device from the device shuttle to the test carrier, the first robot being configured to move in a second dimension that is different from the first dimension.

21. The test system of claim 20, further comprising:
a second robot to move the at least some of the devices between the tray and the device shuttle.

22. The test system of claim 20, wherein the tray is a first tray; and
wherein the test system further comprises:
a second tray to hold devices; and
a second robot to move the first device from the first tray to the shuttle and to move a second device among the devices that has been tested from the shuttle to the second tray.

* * * * *